United States Patent [19]

Liu et al.

[11] Patent Number: 5,089,247

[45] Date of Patent: Feb. 18, 1992

[54] PROCESS FOR PRODUCING ZIRCONIUM-DOPED PSEUDOBOEHMITE

[75] Inventors: Anh T. Liu, Munich; Rudolf Schwarz, Alzenau-Wasserlos; Peter Kleinschmit, Hanau, all of Fed. Rep. of Germany

[73] Assignee: Degussa Aktiengesellschaft, Frankfurt am Main, Fed. Rep. of Germany

[21] Appl. No.: 489,795

[22] Filed: Mar. 5, 1990

Related U.S. Application Data

[60] Continuation of Ser. No. 407,194, Sep. 14, 1989, abandoned, which is a division of Ser. No. 296,965, Jan. 13, 1989, Pat. No. 5,032,378.

[30] Foreign Application Priority Data

Jan. 19, 1988 [DE] Fed. Rep. of Germany ....... 3801270

[51] Int. Cl.$^5$ .......................... C01G 25/02; C01F 7/02; B01J 21/00
[52] U.S. Cl. .................................... 423/600; 423/71; 423/115; 423/625; 423/628; 502/349; 501/105
[58] Field of Search ........................ 502/349, 355, 415; 501/12, 105; 423/628, 625, 600, 71, 115

[56] References Cited

U.S. PATENT DOCUMENTS

| | | | |
|---|---|---|---|
| 2,984,630 | 5/1961 | Braithwaite | 423/628 |
| 4,154,812 | 5/1979 | Sanchez et al. | 423/628 |
| 4,248,852 | 2/1981 | Wakabayashi et al. | 423/631 |
| 4,313,923 | 2/1982 | Block et al. | 432/628 |
| 4,314,827 | 2/1982 | Leitheiser et al. | 501/105 |
| 4,574,003 | 3/1986 | Gerk | 423/628 |
| 4,681,869 | 7/1987 | Kukes et al. | 502/349 |
| 4,769,351 | 9/1988 | Soamiya et al. | 423/115 |
| 4,880,757 | 11/1989 | Henslee et al. | 423/115 |
| 4,900,701 | 2/1990 | Morishita et al. | 501/105 |

FOREIGN PATENT DOCUMENTS

6355119 3/1988 Japan ................................ 501/105

Primary Examiner—Michael Lewis
Assistant Examiner—Steven Bos
Attorney, Agent, or Firm—Beveridge, DeGrandi & Weilacher

[57] ABSTRACT

Zirconium-doped pseudoboehmite with the following properties: zirconium content of 0.5 to 10 mol % relative to Al water content of 20 to 35 weight percent total of the anionic impurities less than 0.5 weight percent. It is synthesized by a process wherein zirconium salt is added in calculated quantity to an aqueous aluminum sulfate solution, the resulting mixture is fed simultaneously with a sodium aluminate liquor into a water pool having a temperature of 50° to 100° C., thereby precipitating zirconium-doped alumina gel while a pH of 3.5 to 8 is maintained, the pH of the suspension is adjusted after addition of the aluminum sulfate solution to 8.5 to 10.5 by further addition of sodium aluminate liquor, the suspension is digested if necessary at the pH of 8.5 to 10.5 and the temperature of 50° to 100° C. for a period of up to 24 hours, the formed pseudoboehmite crystals are filtered off, the filter cake is redispersed with water and the suspension is sprayed-dried. By calcining at 700° to 1100° C., preferably at 850° to 950° C., the pseudoboehmite is further processed to zirconium-doped gamma-alumina suitable for automobile exhaust catalysts.

22 Claims, 6 Drawing Sheets

PROCESS FOR PRODUCING ZIRCONIUM-DOPED PSEUDOBOEHMITE

REFERENCE TO RELATED APPLICATIONS

This application is a continuation of our U.S. patent application Ser. No. 07/407,194 filed Sept. 14, 1989, now abandoned, which in turn is a divisional application of our U.S. patent application Ser. No. 07/296,965 filed Jan. 13, 1989, now U.S. Pat. No. 5,032,378 issued July 16, 1991, all of which are relied on and incorporated herein.

INTRODUCTION AND BACKGROUND

The present invention relates to a zirconium-doped pseudoboehmite and the process for its production. In addition, the invention relates to zirconium-doped gamma-alumina synthesized from the pseudoboehmite, the process for its production as well as its use for making automobile exhaust-gas catalysts.

It is known that hydrated alumina containing essentially pseudoboehmite can be synthesized (European Patent 13,796).

Pseudoboehmites can be used for making automobile exhaust-gas catalysts.

It is also known that, in order to make a support catalyst for purification the exhaust gases of internal combustion engines, a ceramic honeycomb body can be immersed in an aqueous suspension which contains a mixture of pseudoboehmite and zirconium oxyhydrate (West German Patent 3,539,127).

In the automobile exhaust-gas catalysts of known composition, sintering of the basic material, and thus deactivation by loss of surface area, can occur due to the high operating temperatures.

SUMMARY OF THE INVENTION

An object of the invention is to produce a support material which exhibits, at high operating temperatures, little shrinkage or little surface loss and, associated therewith, less deactivation.

In achieving the above and other objects, one feature of the invention is a zirconium-doped pseudoboehmite, which has the following properties: zirconium content: 0.5 to 10 mol % relative to Al; water content: 20 to 35 weight percent; total of the anionic impurities: <0.5 weight percent.

The zirconium-doped pseudoboehmite incorporating the invention can be produced in a process wherein a calculated amount of zirconium salt is added to an aqueous aluminum sulfate solution, the resulting mixture is fed simultaneously with a sodium aluminate liquor into a pool of water having a temperature of 50° C. to 100° C., thereby precipitating zirconium-doped alumina gel while maintaining a pH of 3.5 to 8. The pH of the suspension is adjusted after addition of the aluminum sulfate solution to 8.5 to 10.5 by further addition of sodium aluminate liquor. The suspension is digested if necessary at the pH of 8.5 to 10.5 and at a temperature of 50° C. to 100° C. for a period of up to 24 hours. The formed pseudoboehmite product is filtered off and the filter cake is washed with water.

In another embodiment of the invention, the zirconium salt is dissolved in water and this solution is added to the pool of water simultaneously with the aluminum sulfate solution and the sodium aluminate liquor.

In a special embodiment of the invention, the washed filter cake is redispersed in water and the resulting suspension is spray-dried.

In one preferred embodiment of the invention, the precipitation is conducted at a temperature of 60° C. to 80° C. and a pH of 4 to 5.

Preferably, the digestion is carried out at a temperature from 60° C. to 80° C. and a pH from 9 to 9.5 for a period of one hour to 5 hours.

The spray-dried, zirconium-doped pseudoboehmite can be calcined at a temperature of 700° C. to 1100° C., preferably 850° C. to 950° C., for a period of 0.5 to 24 hours. In that way the pseudoboehmite is converted into zirconium-doped gamma-$Al_2O_3$, which has the desired specific BET surface of 145±25 to 225 ±25 $m^2/g$.

The zirconium component can be introduced in the form of salts, e.g. zirconium chloride, zirconium nitrate, zirconium carbonate.

Another feature of the invention is the zirconium-doped gamma-alumina synthesized from the zirconium-doped pseudoboehmite according to the invention. This gamma-alumina has a zirconium content of 0.5 to 10 mol % relative to Al, a water content of <10 weight percent and a phase stability up 1050° C.

The temperature stability of the gamma-alumina is significantly improved by doping with zirconium.

The zirconium-doped gamma-alumina according to the invention can be used for, making automobile exhaust-gas catalysts.

BRIEF DESCRIPTION OF THE DRAWINGS

The invention will be described more fully with reference to the accompanying drawings, in which.

DETAILED DESCRIPTION OF EMBODIMENTS

EXAMPLES

Figure 1:
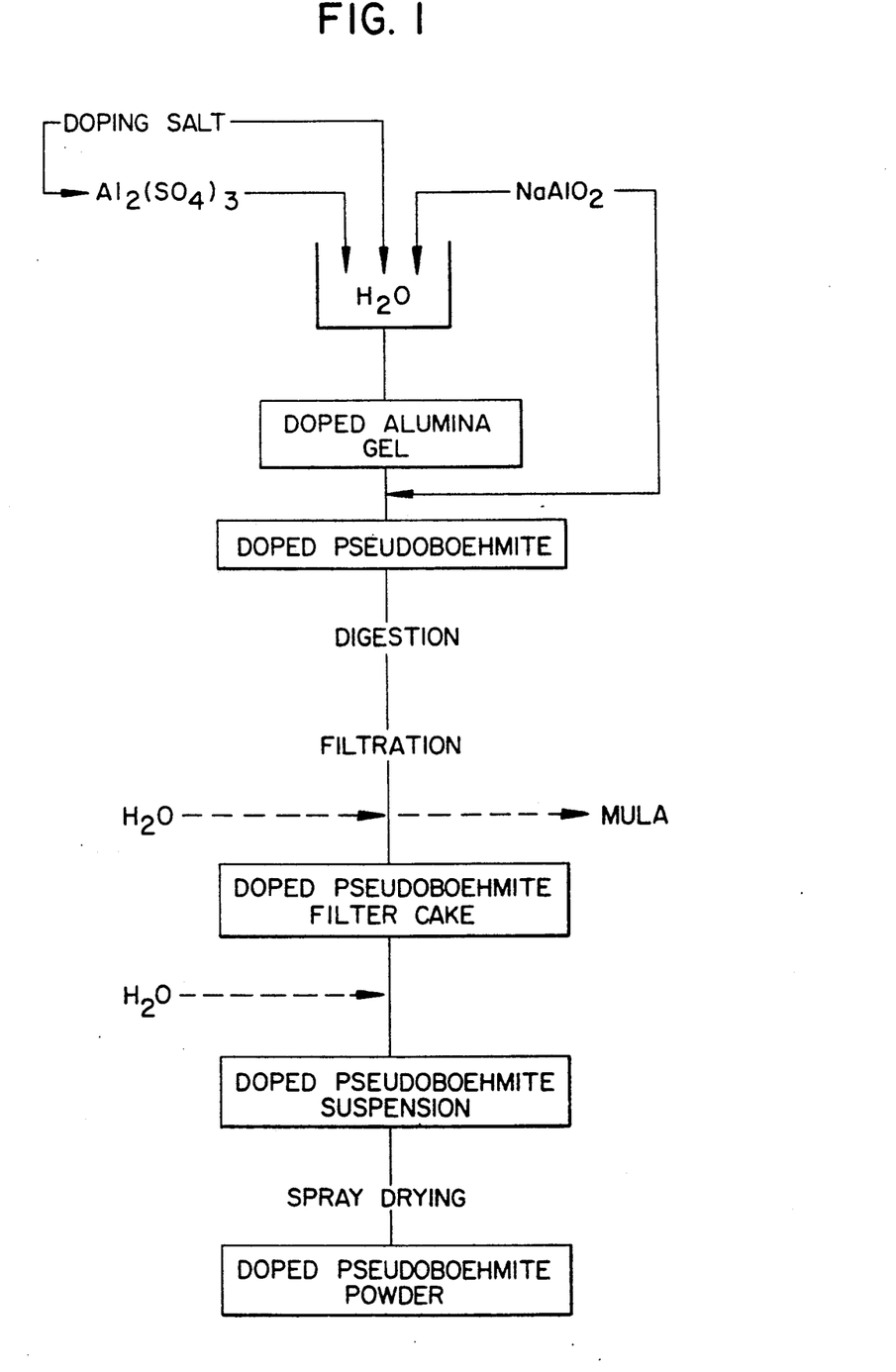
FIG. 1 shows a flow diagram of the process according to the invention for the production of zirconium-doped pseudoboehmite.

The examples are carried out by the process described schematically in FIG. 1.

As is generally known for pseudoboehmite formation, the most relevant reaction parameters are the pH and temperature conditions of the precipitation and the digestion process. The examples illustrate the influence of the doping material and of the doping level (Zr/Al molar ratio) on the surface stabilization and on the crystallographic formation as well as chemical puring; the results are summarized in Tables 1 to 3, and shown in FIG. 2. Selected samples are examined in detail with respect to their phase and surface stability, and compared to known commercial products (Kaiser SA washcoat grade, Pural SB and Pural SF of the CONDEA) in FIGS. 3 to 6.

The samples are examined immediately after pH adjustment and after a 20- to 23- hour digestion. Thereby, it is found that even small additions of doping material can strongly influence the pseudoboehmite formation.

Additions of zirconium chloride in a molar ratio of Zr/Al =1/100 (Table 1) and Zr/Al =5/100 (Table 2) lead to no fundamental change in pseudoboehmite crystallization. In a manner similar to the case of precipitation of pure pseudoboehmite alumina trihydrate can be formed in different concentrations when the precipitation is conducted at pH =6 to 8.

Figure 2:
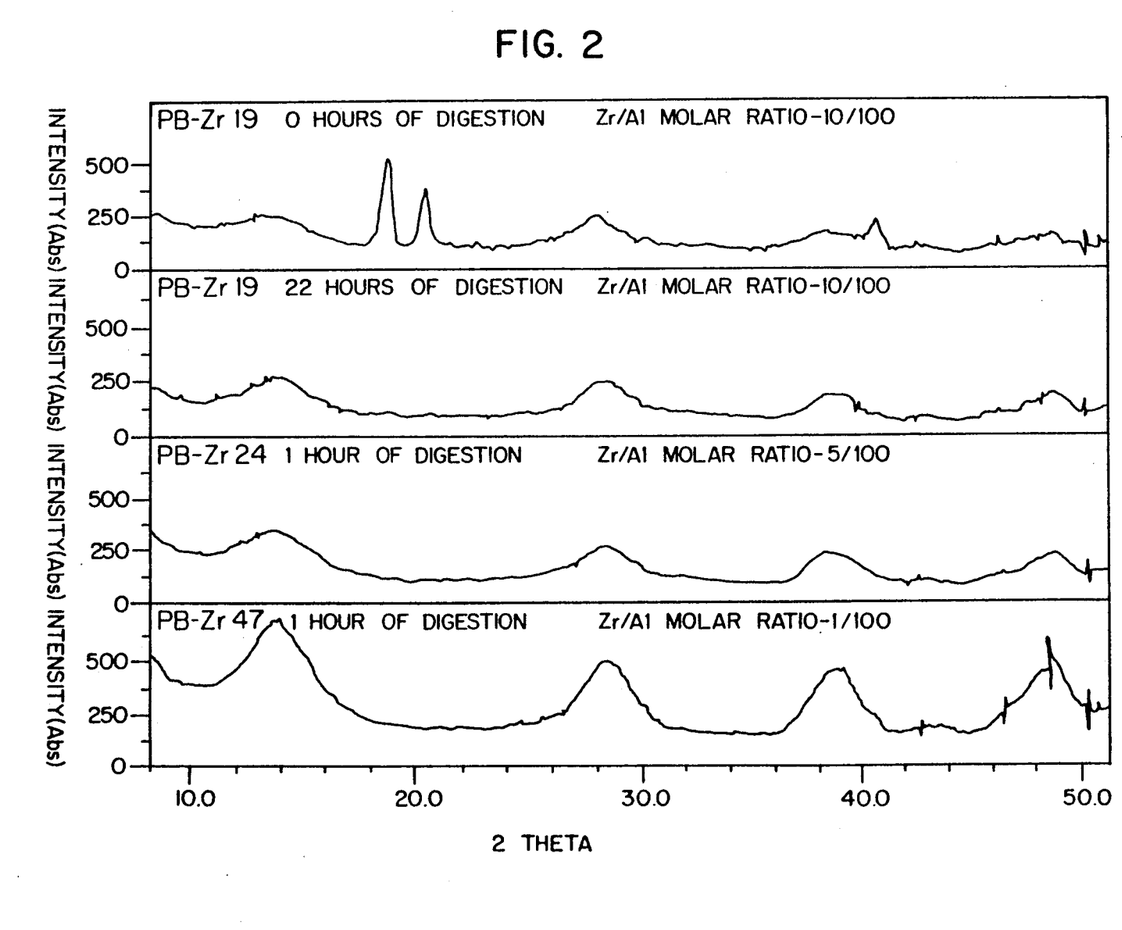
FIG. 2 shows the influence of the doping level on the pseudoboehmite formation.

The gradual influence of doping with zirconium chloride on the crystallization at a precipitation pH of 4 is presented in Table 3 and illustrated in FIG. 2: with increasing zirconium concentration, either the product becomes more amorphous or trihydrate forms as a secondary phase and disappears only during digestion.

Additions of zirconium nitrate or carbonate cause a shift toward formation of alumina trihydrate or amorphous substances (Table 2).

For the production of pure pseudoboehmite, it is necessary to adjust the pH of the suspension within a narrow range around the isoelectric point, in order to minimize the adsorption of sodium and sulfate ions.

By doping with zirconium chloride, however, it is possible to improve the chemical purity of the product to a great extent, since the formation of insoluble sulfate (in the form of basic alumina) is suppressed or reduced (Tables 1 to 3).

The determination of the specific surface is carried out on digested samples, as obtained in fresh form after spray drying or after they have been calcined for one hour at 900° C. The results are listed in Tables 1 to 3.

The data show that the increase of the specific surface area is achieved by optimizing the precipitation and digestion conditions for specific doping components.

Figure 3:
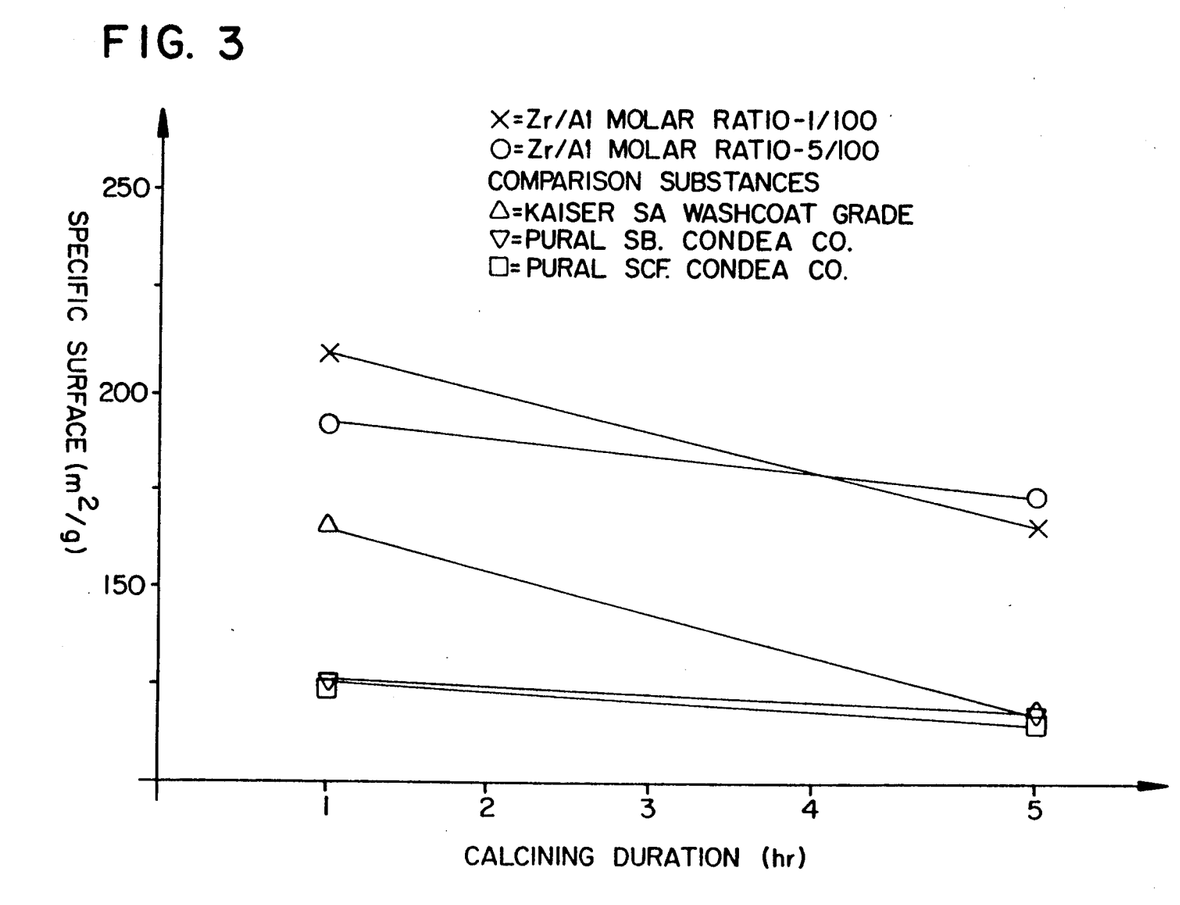
FIG. 3 shows the surface loss as a function of calcining duration at 900° C.
Figure 4:
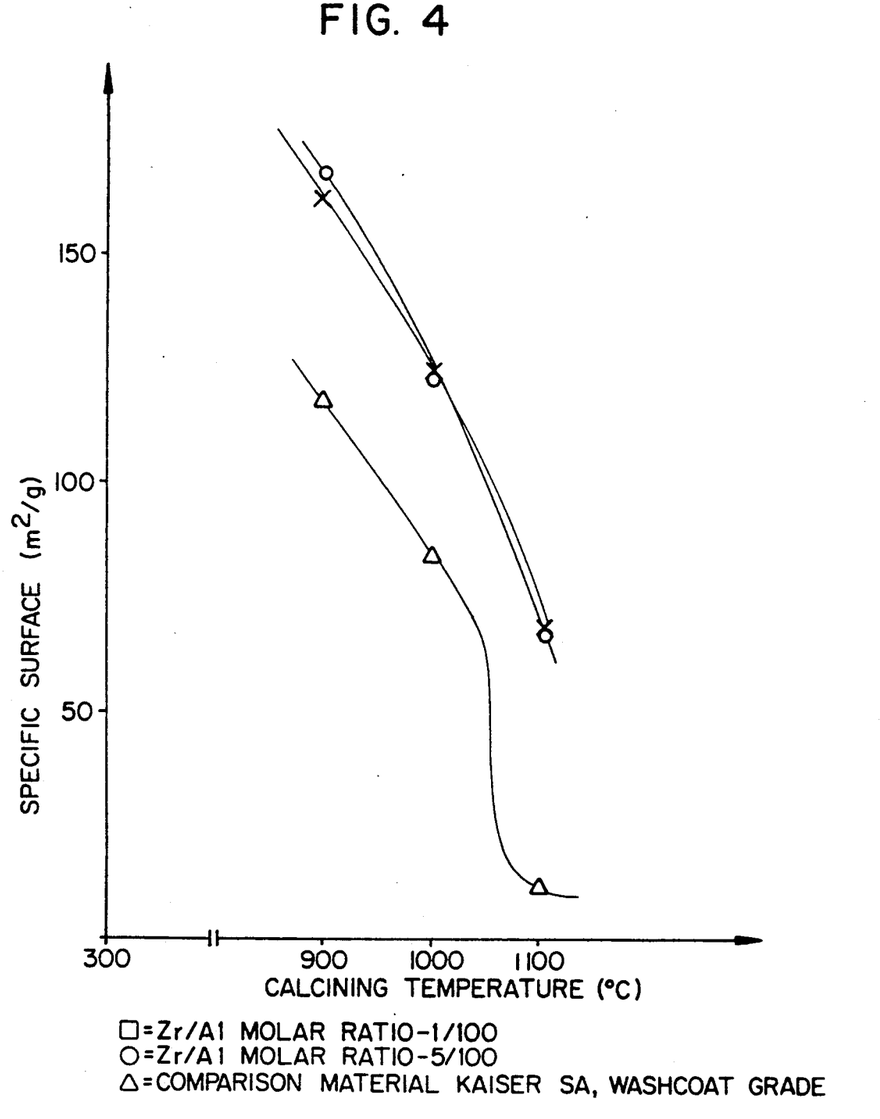
FIG. 4 shows the surface loss as a function of calcining temperature (1-hour holding time).
Figure 5:
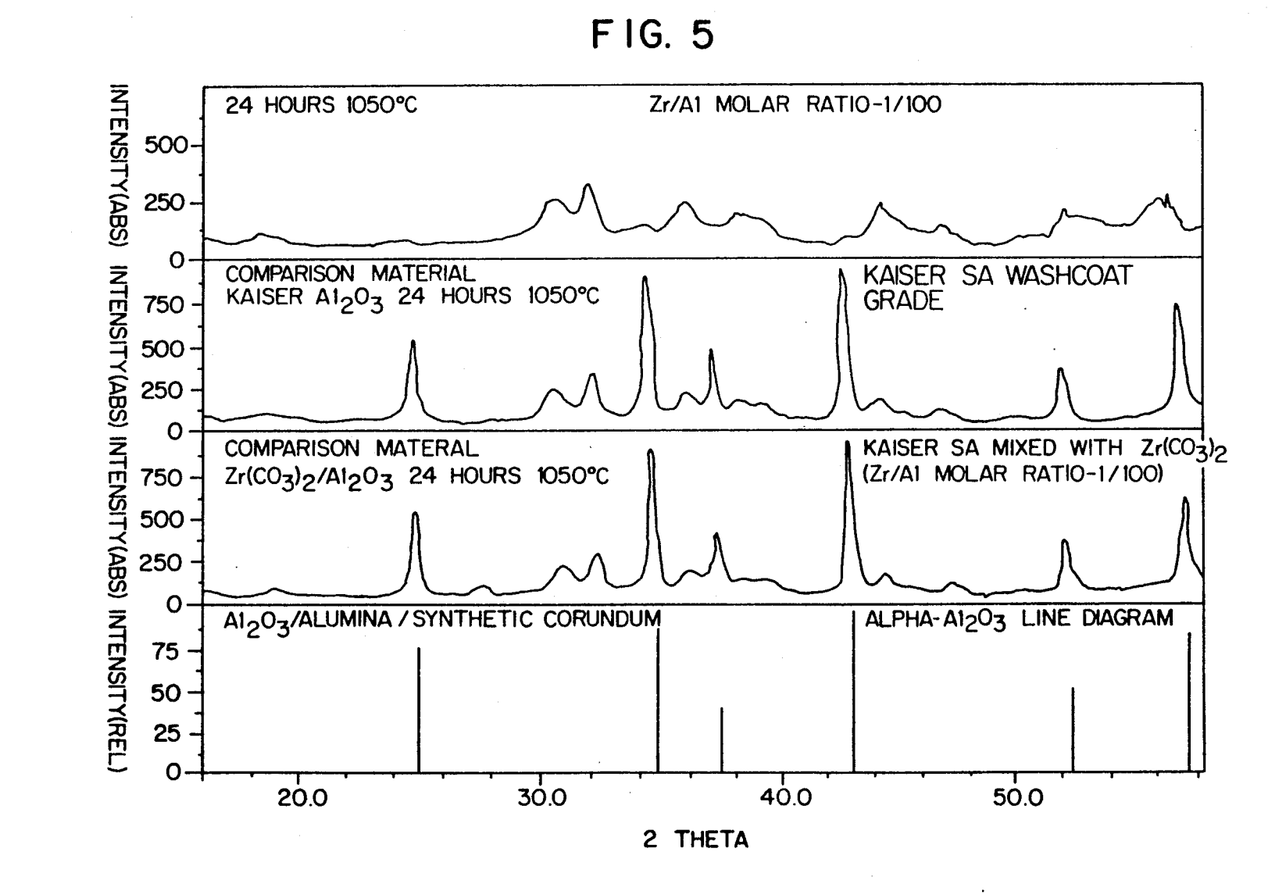
FIG. 5 shows the phase analysis after calcining at 1050° C. (24 hours holding time).
Figure 6:
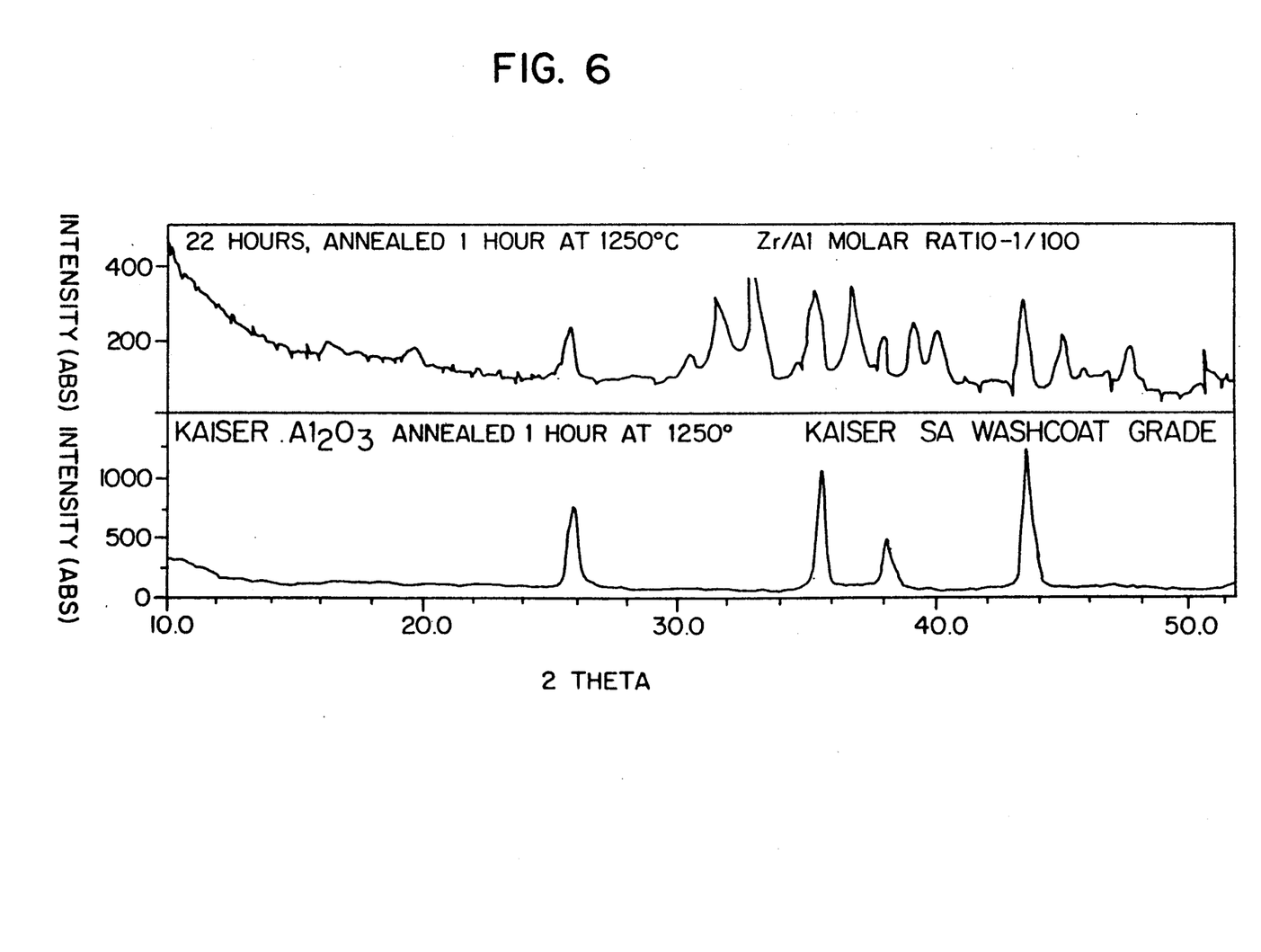
FIG. 6 shows the phase analysis after annealing at 1250° C. (1-hour holding time).

Zirconium-doped pseudoboehmite samples are calcined under different conditions and compared with identically treated commercial products: FIGS. 3 and 4 respectively clearly show the superiority of the zirconium-doped pseudoboehmite and gamma-aluminas according to the invention.

The X-ray diagrams of the calcined samples (FIGS. 5 and 6) provide a plausible explanation for the surface stability of the doped test products:

In the case of Kaiser SA, the transformation to alpha-alumina is advanced at 1050° C. and is complete at 1250° C.

No improvement can be seen by admixing zirconium carbonate.

In the case of zirconium-doped pseudoboehmite, the gamma phase is practically unchanged at 1050° C. and is still largely preserved up to 1250° C.

By precipitation with transition-metal oxides, doped pseudoboehmites having high specific surfaces are obtained under optimized conditions. Because of the doping, the deactivation of the alumina under thermal loads is greatly retarded, and so the new materials are very suitable as catalyst supports for use at very high temperatures (about 1000° C.).

Further variations and modifications will be apparent to those skilled in the art from the foregoing and are intended to be encompassed by the appended claims. German priority application P. 38 01 270.7-41 is relied on and incorporated herein.

TABLE 1

Influence of the precipitation and digestion: Doping in Zr/Al molar ratio = 1/100

| Doping | Precipitation Temp. (°C.) | Precipitation pH | Digestion Temp. (°C.) | Digestion pH | Duration (h) | Specific surface Fresh ($m^2/g$) | Specific surface Calc. ($m^2/g$) | Chemical analysis $Na_2O$ (ppm) | Chemical analysis $SO_4$ (wt %) | Phase analysis* a PB/TH | Phase analysis* b PB/TH |
|---|---|---|---|---|---|---|---|---|---|---|---|
| none | 60 | 4 | 80 | 9 | 20 | 268 | 154 | 30 | 2.07 | m | m |
| $ZrCl_4$ | 60 | 4 | 60 | 9 | 21 | 294 | 159 | 28 | 1.91 | w | m |
|  | 80 | 4 | 80 | 9 | 1 | 304 |  | 80 | 0.11 |  | m |
|  | 80 | 4 | 80 | 9 | 20 | 308 | 204 | 77 | <0.1 | m | m |
|  | 60 | 4 | 80 | 9.5 | 21 | 243 | 151 | 73 | <0.05 | m | m |
|  | 80 | 4 | 80 | 9.5 | 1 | 335 | 183 | 87 | <0.02 |  | m |
|  | 60 | 6 | 60 | 9.5 | 23 | 285 | 166 | 30 | <0.1 | m/vs | m/t |
|  | 60 | 6 | 80 | 9.5 | 22 | 282 | 171 | 75 | <0.1 | w | m |
|  | 80 | 6 | 80 | 9.5 | 21 | 345 | 145 | 290 | <0.1 | m/vs | m |
|  | 60 | 8 | 60 | 10 | 21 | 300 | 189 | 65 | <0.1 | m/t | m |
|  | 60 | 8 | 80 | 9.5 | 22 | 306 | 190 | 89 | <0.1 | w | m |
| $Zr(CO_3)_2$ | 60 | 4 | 80 | 9.5 | 22 | 272 | 148 | 94 | <0.1 | w | m |
| $Zr(SO_4)_2$ | 80 | 4 | 80 | 9.0 | 21 |  |  | not determined** |  |  |  |
|  | 80 | 4 | 80 | 9.5 | 21 |  |  | not determined** |  |  |  |

*a = product was isolated and examined before digestion
b = product examination after the indicated digestion time
PB = pseudoboehmite
TH = trihydrate
t = traces
w = weak
m = medium
vs = very strong
**smeary product which was difficult to filter, and which was not further examined

TABLE 2

Influence of anions: Doping with $ZrCl_4$, $Zr(NO_3)_2$; $Zr(CO_3)_2$ Zr/Al molar ratio = 5/100

| Doping | Precipitation Temp. (°C.) | Precipitation pH | Digestion Temp. (°C.) | Digestion pH | Duration (h) | Specific surface Fresh ($m^2/g$) | Specific surface Calc. ($m^2/g$) | Chemical analysis $Na_2O$ (ppm) | Chemical analysis $SO_4$ (wt %) | Phase analysis* a PB/TH | Phase analysis* b PB/TH |
|---|---|---|---|---|---|---|---|---|---|---|---|
| $ZrCl_4$ | 60 | 4 | 60 | 9.5 | 21 | 276 | 163 | 36 | <0.1 | w | w |
|  | 60 | 4 | 80 | 9.5 | 22 | 267 | 157 | 79 | <0.1 | m | m |
|  | 80 | 4 | 80 | 9.5 | 1 | 345 | 207 | 87 | <0.1 |  | w |

TABLE 2-continued

Influence of anions: Doping with ZrCl₄, Zr(NO₃)₂, Zr(CO₃)₂ Zr/Al molar ratio = 5/100

| Doping | Precipitation Temp. (°C.) | pH | Digestion Temp. (°C.) | pH | Duration (h) | Specific surface Fresh (m²/g) | Calc. (m²/g) | Chemical analysis Na₂O (ppm) | SO₄ (wt %) | Phase analysis* a PB/TH | b PB/TH |
|---|---|---|---|---|---|---|---|---|---|---|---|
| | 80 | 4 | 80 | 9.5 | 22 | 304 | 192 | 161 | <0.1 | w | m |
| | 60 | 6 | 60 | 9.5 | 22 | 310 | 173 | 93 | <0.1 | w | w/t |
| | 60 | 6 | 80 | 9.5 | 22 | 306 | 164 | 138 | <0.1 | w/vs | m |
| | 60 | 8 | 60 | 9.5 | 22 | 322 | 201 | 152 | <0.1 | w/vs | m/m |
| | 60 | 8 | 80 | 9.5 | 22 | 375 | 203 | 132 | <0.1 | w/s | m |
| | 80 | 8 | 80 | 10 | 22 | 301 | 177 | 212 | <0.1 | m/s | m |
| | 80 | 8 | 80 | 10.5 | 22 | 246 | 152 | 2000 | <0.1 | m/s | m/vs |
| Zr(NO₃)₄ | 60 | 4 | 80 | 9.5 | 21 | 352 | 225 | 143 | <0.1 | w/vs | m |
| | 80 | 6 | 80 | 9.5 | 22 | 299 | 174 | 148 | <0.1 | w | w |
| | 80 | 8 | 80 | 9.5 | 22 | 296 | 184 | 225 | <0.1 | w | w |
| Zr(CO₃)₂ | 60 | 4 | 80 | 9.5 | 22 | 296 | 184 | 225 | <0.1 | m/vs | m |

*a = product was isolated and examined before digestion
b = product examination after the indicated digestion time
PB = pseudoboehmite
TH = trihydrate
T = traces
w = weak
m = medium
s = strong
vs = very strong

TABLE 3

Influence of doping level: Doping with ZrCl₄

| Doping | Precipitation Temp. (°C.) | pH | Digestion Temp. (°C.) | pH | Duration (h) | Specific surface Fresh (m²/g) | Calc. (m²/g) | Chemical analysis Na₂O (ppm) | SO₄ (wt %) | Phase analysis* a PB/TH | b PB/TH |
|---|---|---|---|---|---|---|---|---|---|---|---|
| 0.5 Mol % Zr | 80 | 4 | 80 | 9.5 | 1 | 330 | 185 | 30 | 3.2 | — | m |
| 1 mol % Zr | 80 | 4 | 80 | 9.5 | 1 | 335 | 183 | 87 | <0.02 | — | m |
| 5 mol % Zr | 80 | 4 | 80 | 9.5 | 1 | 345 | 207 | 87 | <0.1 | — | w |
| 10 mol % Zr | 60 | 4 | 80 | 9.5 | 22 | 306 | 169 | 630 | <0.1 | w/vs | w |

***a = product was isolated and examined before digestion
b = product examination after the indicated digestion time
PB = pseudoboehmite
TH = trihydrate
A = amorphous product
w = weak
m = medium
vs = very strong

We claim:

1. A process for the production of zirconium-doped pseudoboehmite, comprising adding a zirconium salt to an aqueous aluminum sulfate solution, feeding the resulting mixture simultaneously with sodium aluminate solution into a pool of water having a temperature of 50° C. to 100° C., thereby precipitating zirconium-doped pseudoboehmite as a zirconium-doped alumina gel while maintaining a pH of 3.5 to 8 in said pool to form a suspension; adjusting the pH of the suspension after the feeding of the aluminum sulfate solution to 8.5 to 10.5 by further addition of sodium aluminate, filtering the formed pseudoboehmite to obtain a filter cake, and washing the filter cake with water.

2. The process according to claim 1, wherein the suspension is digested at the pH of 8.5 to 10.5 and the temperature of 50° C. to 100° C. for a period of up to 24 hours.

3. The process according to claim 1, wherein the zirconium-doped pseudoboehmite has a zirconium content of 0.5 to 10 mol % relative to Al; a water content of 20 to 35 wight percent; and total anionic impurities less than 0.5 weight percent, wherein said pseudoboehmite is further calcined at a temperature of 700° C. to 1100° C., thus producing a zirconium-doped gamma-alumina product.

4. The process according to claim 3 wherein the temperature of 850° C. to 950° C.

5. The process according to claim 1 wherein the precipitation takes place at a temperature in the range of 60° C. to 80° C.

6. The process according to claim 1, wherein the pH of the pool during precipitation is in the range of 4 to 5.

7. The process according to claim 2, wherein the pH during digestion is in the range of 9 to 9.5.

8. The process according to claim 3, wherein the temperature during digestion is in the range of 60° C. to 80° C.

9. The process according to claim 2, wherein the period of digestion is in the range of 1 to 5 hours.

10. The process according to claim 2, wherein the zirconium salt is selected from the group consisting of zirconium chloride, zirconium nitrate, and zirconium carbonate.

11. The process according to claim 1, wherein the zirconium salt is added in a sufficient amount to produce a 0.5 to 10 mol % zirconium content relative to aluminum in the zirconium-doped pseudoboehmite.

12. A process for the production of zirconium-doped pseudoboehmite wherein a zirconium salt is dissolved in water and this solution is added to a pool of water having a temperature of 50° C.-100° C. simultaneously with an aluminum sulfate solution and a sodium aluminate liquor, thereby precipitating zirconium-doped pseudoboehmite as a zirconium-doped alumina gel while maintaining a pH of 3.5 to 8 in said pool to form a suspension; adjusting the pH of the suspension after the feeding of the aluminum sulfate solution to 8.5 to 10.5 by further addition of sodium aluminate, filtering the formed pseudoboehmite to obtain a filter cake, and washing the filter cake with water.

13. The process according to any one of claims 1–12, wherein the washed filter cake is redispersed with water and the resulting suspension is spray-dried.

14. The process according to claim 12, wherein the suspension is digested at the pH of 8.5 to 10.5 and the temperature of 50° C. to 100° C. for a period of up to 24 hours.

15. The process according to claim 12, wherein the zirconium-doped pseudoboehmite has a zirconium content of 0.5 to 10 mol % relative to Al; a water content of 20 to 35 wight percent; and total anionic impurities less than 0.5 weight percent, wherein said pseudoboehmite is further calcined at a temperature of 700° C. to 1100° C., thus producing a zirconium-doped gamma-alumina product.

16. The process according to claim 15, wherein the temperature during calcination is in the range of 850° C. to 950° C.

17. The process according to claim 12, wherein the precipitation takes place at a temperature in the range of 60° C. to 80° C.

18. The process according to claim 12, wherein the pH of the pool during precipitation is in the range of 4 to 5.

19. The process according to claim 14, wherein the pH during digestion is in the range of 9 to 9.5.

20. The process according to claim 14, wherein the temperature during digestion is in the range of 60° C. to 80° C.

21. The process according to claim 14, wherein the period of digestion is in the range of 1 to 5 hours.

22. The process according to claim 12, wherein the zirconium salt is selected from the group consisting of zirconium chloride, zirconium nitrate, and zirconium carbonate.

* * * * *